Sept. 7, 1948.  J. J. WHARAM ET AL  2,448,851
STEERING LINKAGE

Filed June 18, 1945  2 Sheets-Sheet 1

J. J. Wharam
F. G. Loon
INVENTORS

BY Edwin C. McRae
R. G. Harris
Attorneys

Sept. 7, 1948. J. J. WHARAM ET AL 2,448,851
STEERING LINKAGE
Filed June 18, 1945 2 Sheets-Sheet 2

J. J. Wharam
F. G. Loon
INVENTORS

Patented Sept. 7, 1948

2,448,851

UNITED STATES PATENT OFFICE 2,448,851

STEERING LINKAGE

John J. Wharam, Dearborn, and Fred G. Loon, Detroit, Mich., assignors to Ford Motor Company, Dearborn, Mich., a corporation of Delaware Application June 18, 1945, Serial No. 600,066

10 Claims. (Cl. 287—90)

This invention relates to steering linkages; and, more particularly, to a steering linkage comprising a steering gear pitman arm, drag link, and wheel steering arm pivoted substantially at a common point, together with a ball joint construction facilitating this type of pivotal attachment.

In automotive steering linkages—particularly those used with independent wheel suspension—it is customary, in one general form of construction, to mount the steering gear on one of the left-side frame members and to provide for uniform steering action of both wheels under the several conditions of displacement by means of a drag link running to an idler arm equivalent to the steering gear pitman arm and attached to the opposite frame member and wheel steering arms leading from equivalent positions on the drag link system to each of the wheels. The scope of the movement involved requires a ball joint connection between the pitman arm and idler arm and the points of connection therewith to the drag link; and ball joints at the inner ends of the wheel steering arms at their points of connection to the drag link system as well as similar connections at the outer ends of the wheel steering arms for the connection to the wheel structure proper. In ordinary practice, the first four ball joints are usually provided at correspondingly spaced intervals on the drag link as may be required by the computed steering geometry for the vehicle. However, each of these individual joints require considerable space; and, under some conditions, the steering geometry requires that the points of attachment of the pitman or idler and the wheel-steering arms at each end of the drag link be arranged in closer proximity than the ordinary methods of construction will allow. Under such circumstances, some compromise or change must be made in the steering linkage to permit the spacing of these elements at a sufficient distance to use the regular ball joint construction. However, this method is not always satisfactory for, under certain circumstances, it is desirable to have these pivot points be as close together as possible or, indeed, to coincide.

It is an advantage of this invention that by utilizing the construction shown, it is possible to mount the pitman arm and wheel steering arm at a common point at each end of the drag link, thereby reducing the over-all size of the joint and markedly limiting the number of parts which go to make up the two joints. It is a further advantage of this invention that a common pivot point for the three associated elements may be used. Another advantage is that the steering geometry may be constructed so as to utilize the maximum effective length of the drag link, limited only by the mounting position of the steering gear on its frame member. A further advantage which flows from the construction shown is that the lubrication and maintenance of the joint is simplified since the double joint—so far as these characteristics are concerned—presents no more difficulties than the conventional single joint. Finally, the weight of the steering assembly, due to the concentration and reduction of parts, is greatly reduced.

With these and other advantages in mind, the invention consists of the structure described in the specification, claimed in the claims, illustrated in the accompanying drawings, in which:

Figures 1, 2:
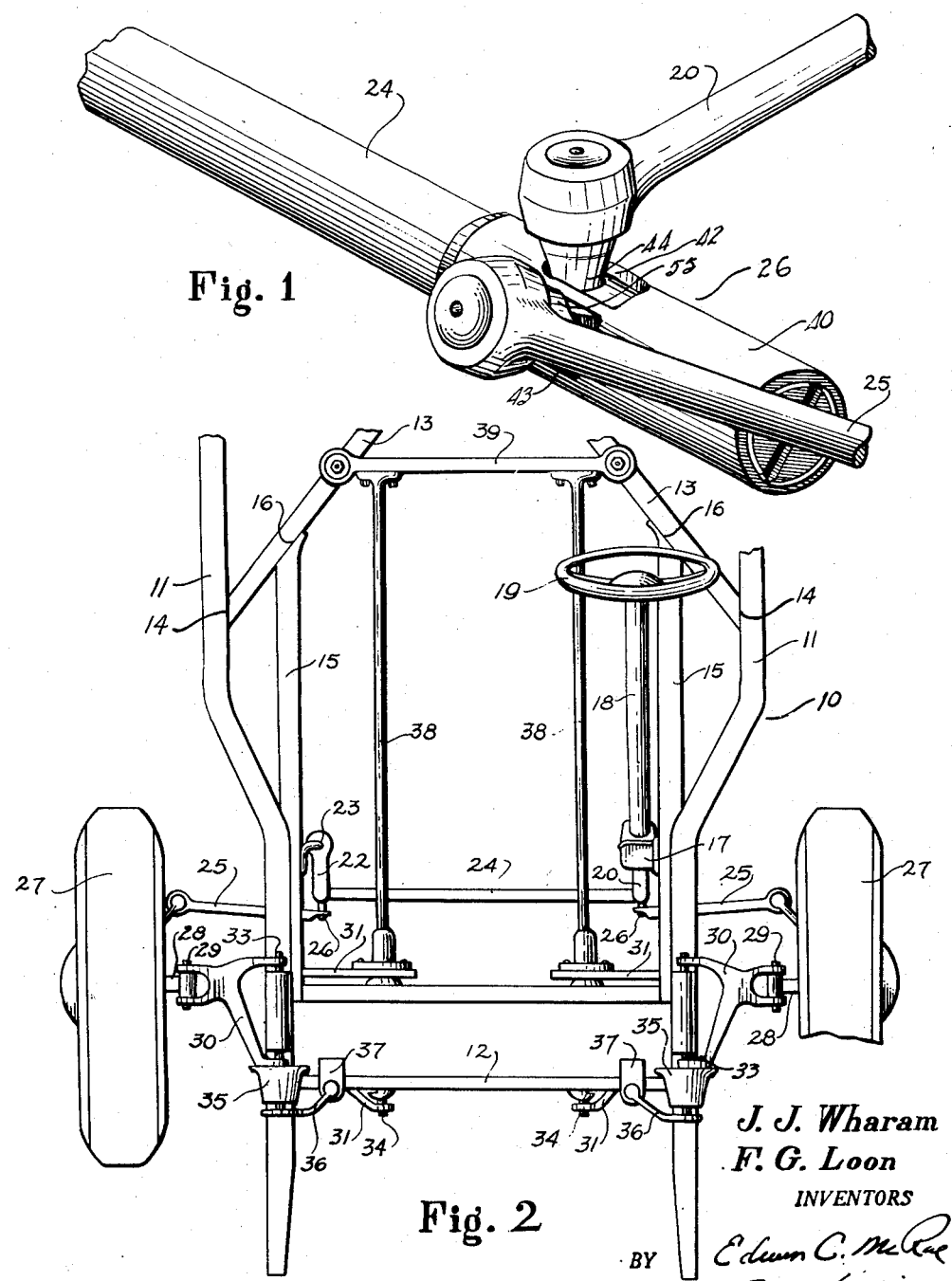
Figure 1 is a perspective view of a ball joint constructed according to this invention.
Figure 2 is a plan view of the forward portion of the automobile employing an independent wheel suspension and indicating an application of the first form of ball joint.

Referring first to Figure 2, 10 indicates, generally, a vehicle chassis having side sills 11, a front cross member 12 and X members 13, which are secured to the sills 11 at 14 and which are joined, as is customary, in a central box section which is not shown in this drawing. Auxiliary longitudinal frame members 15 extend rearwardly from each side sill 11 to the point of connection 16 with the respective X members 13.

The steering gear 17 is mounted on the left-hand auxiliary member 15 supporting the steering column 18 and steering wheel 19 and operating the steering pitman arm 20. An idler arm 22 equivalent to the pitman arm 20 is pivotally mounted at 23 on the right-hand auxiliary frame member 15 and the arms 20 and 22 are joined to the drag link 24 and also to the wheel steering arm 25 by the ball joint 26. The showing of the joint 26 in this view is mainly diagrammatic to indicate its relation to the associated parts of the vehicle steering system.

The front wheels 27 are rotatably supported on a king pin which, in turn, is carried by a bracket 28, pivotally mounted on longitudinal axes 29 on the outer ends of the upper and lower wishbone links or yokes 30 and 31. The inner ends of the links 30 and 31 are attached to the side sills 11 or cross member 12 by the longitudinal pivots 33 and 34, respectively. A shock absorber 35 of the rotating vane type is secured to the forward inner end of the upper wishbone 30, and the shock absorber arm 36 extends inwardly therefrom to a pad 37 on the front cross member 12 to which it is secured.

The resilient mounting of the wheels comprises two parallel, longitudinally extending torsion bars 38 which are fixed at their forward ends to the rearward arm of the lower wishbone link 31 in substantial axial alignment with the longitudinal pivots 34. The rear ends of the bars 38 are upset and bolted to the torsion bar anchor member 39, which is resiliently supported at its opposite ends by means of interposed rubber pucks or by similar structures on the frame X members 13. This construction is substantially that shown in the copending application for an independent suspension filed by John J. Wharam and Jerome J. Felts, Serial No. 596,732, filed May 30, 1945.

Figure 3:
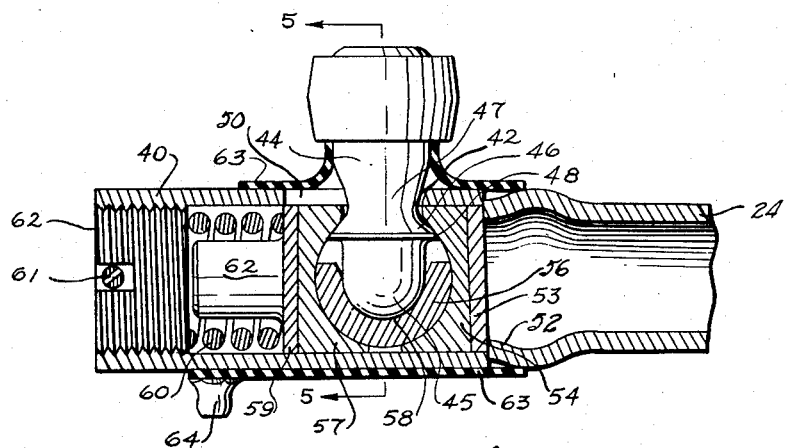
Figure 3 is a transverse longitudinal section through the joint of this invention taken substantially as indicated by the line 3—3 of Figure 5.
Figure 4:
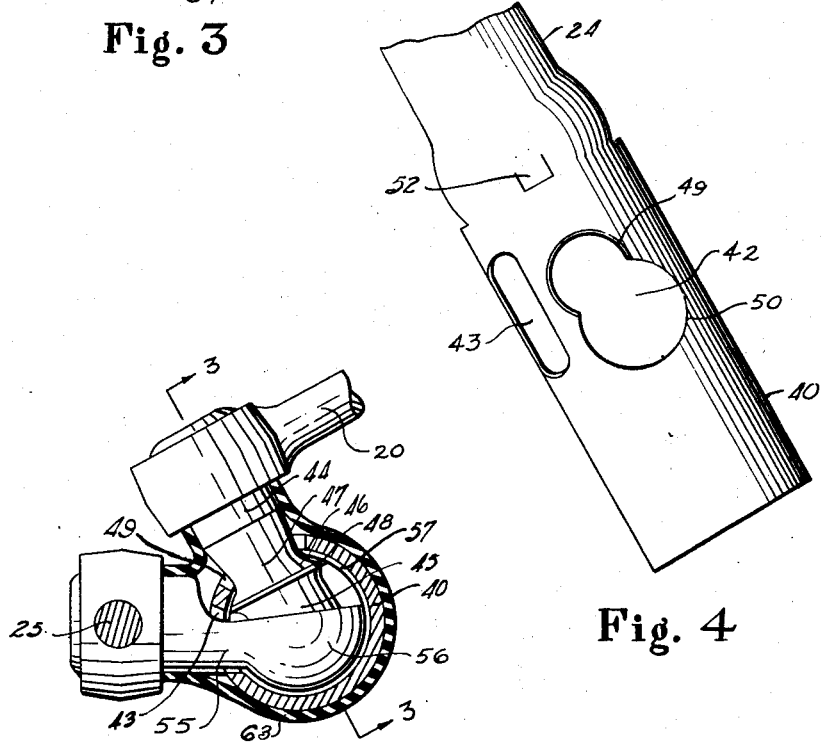
Figure 4 is a plan view of a housing end of the drag link used in this invention.
Figure 5:
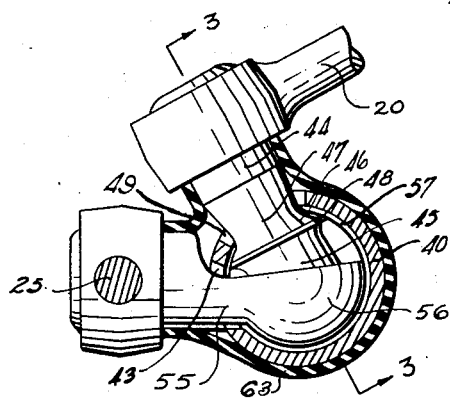
Figure 5 is a transverse section through the joint taken substantially as indicated by the line 5—5 of Figure 3.

Attention is now directed to Figures 3, 4, and 5, showing in detail the construction of the ball joints. A drag link 24 is upset to form an enlarged tubular portion 40 at each end with an opening 42 in the top thereof and another opening 43 on one side. The top opening 42 is designed to accommodate the shank 44 to which the pitman arm 20 or idler arm 22 is fixedly secured. The shank 44 has a lower ball portion 45, and an upper ball portion 46 substantially larger in diameter and terminating above in a restricted neck 47 and below in the flange 48. The opening 42 comprises an inner partially circular opening 49 having a diameter conforming to that of the restricted neck 47 joining with an outer circular opening 50 having a diameter conforming to that of the flange 48. The side opening 43 is relatively elongated and receives the shank 55 which is rigidly secured to the wheel steering arm 25. The shank 55 is formed at its inner end with a ball portion 56 having an outer diameter conforming to that of the upper ball portion 46 of the shank 44 and a central spherical concavity 58 serving as a socket for the lower ball portion 45 of the shank 44 and, of course, being the same diameter as the ball 45.

In assembling the device, a washer 53 and the inner ball socket 54 are inserted in the tubular end 40 and slide inwardly until they abut the ears 52 struck inwardly from the wall of the link 24. The ball portion 56 of the shank 55 then slides through the side opening 43 and is seated in the partial socket afforded by the part 54. The shank 55 may then be rotated slightly counter-clockwise (referring to Figure 3) until its central socket 58 is substantially aligned with the larger opening 50 in the tube 40. The shank 44 may then be inserted through the opening 50 until its lower ball portion 45 is seated in the central socket 58. The shank 44 is then rotated in a plane longitudinally of the link until its neck 47 is seated in the smaller opening 49. The outer ball socket 57 is inserted through the outer end of the tube 40 and is pushed inwardly until it engages the outer side of the ball portion 56 of the shank 55 and the upper ball portion 46 of the shank 44. The washer 59 is also inserted in the same manner and is held in place by the spring 60 and the plug 62 screwed in the threaded end of the tube 40 and secured there by a cotter pin 61. The washer 59 has an abutment 62' limiting the movement of the outer ball socket 57 with respect to the plug 62. A rubber sheath 63 surrounds the outer portion of the tube 40 and the shanks 44 and 55 and lubrication fitting 64 permits the necessary lubrication.

It is believed that the advantages of the present construction will be at once apparent. Not only is it possible to have both the pitman arm and the steering arm pivoted at the same point on the drag link, thereby giving a wider scope for the construction of various steering geometries, but the auxiliary parts required to make both joints are substantially those which heretofore have been required in the construction of each of them. Thus, the entire structure, with the exception of the shank for the pitman arm 44, is substantially that of a conventional ball joint. However, by utilizing a portion of the ball on the shank 55 of the wheel steering arm as a socket for the lower ball portion 45 of the shank 44 and forming the shank 44 with an auxiliary outer ball surface which also engages the socket formed by the parts 57 and 54, a ball mounting is also provided for the shank 44 without the use of any additional parts. At the same time, the upper ball portion 46 of the shank 44 serves to secure the ball portion 56 of the shank 55 in place and permits the use of substantially half the usual ball section on that shank. From this permissible reduction in the size of the ball portion stems the construction by means of which it is possible to seat the ball portion 56 directly through the side opening 43 and yet have it rotatably secured in place by the interposition of the shank 44. Further, due to the arrangement of the openings 49 and 50 in the upper part of the tube 40, after the shank 55 has been inserted as described, the corresponding shank 44 may then be inserted, engaged in the central socket 58 and the entire structure locked by sliding the shank 44 outwardly until its neck 47 is securely seated in the opening 49. Thereafter, the outer socket 57 holds the entire joint in permanently assembled relation.

This construction permits the desired range of movement to both elements, namely, rotation of the pitman arm about the longitudinal axis of the shank 44 or an axis normal to the longitudinal axis of the link 24, and limited universal movement of the shank 55 about the center of the ball portion 56 with the maximum permissible amplitude being in a plane passing through the longitudinal axis of the link 24.

The construction resulting is very compact and simple in both manufacture and assembly. It is fully as durable and economical in maintenance as are the conventional single joints heretofore used. It affords the designer a wider latitude in the design of steering mechanisms and leads to simplification of the entire steering linkage.

Certain changes may be made in the detailed construction shown herein; but it is the intention to cover by the claims these changes and others reasonably within the scope thereof.

The invention claimed is:

1. In a steering linkage for an automotive vehicle having a steering gear pitman arm and a steering wheel arm and a drag link, a ball joint in said drag link comprising a first shank adapted to be secured to said pitman arm, a second shank adapted to be secured to said wheel steering arm, socket means in said joint permitting pivotal movement of said first shank about one axis, socket means in said joint permitting pivotal movement of said second shank about a second axis, said axes being obliquely disposed and intersecting in a common point in said joint.

2. In a steering linkage for an automotive vehicle having a steering gear pitman arm and a steering wheel arm and a drag link, a ball joint in said drag link comprising a first shank adapted to be secured to said pitman arm, a second shank adapted to be secured to said wheel steering arm, a socket formed in said ball joint and pivotally mounting both said shanks for independent rotation about obliquely disposed axes, said axes intersecting in a common point in said ball joint.

3. In a steering linkage for an automotive vehicle having a steering gear pitman arm and a wheel steering arm and a drag link, a ball joint in said drag link comprising a first shank adapted to be secured to said pitman arm, a second shank adapted to be secured to said wheel steering arm, a first socket formed in said joint receiving both said shanks for independent pivotal movement about obliquely disposed axes, a second socket formed in one of said shanks within said joint and a co-operating ball on the other of said shanks adapted to be received in said second socket, said axes being obliquely disposed and intersecting at a common point corresponding to the center of said last-named ball.

4. In a steering linkage for an automotive vehicle having a steering gear pitman arm and a wheel steering arm and a drag link, a ball joint in said drag link comprising a first shank adapted to be secured to one said arm, a second shank adapted to be secured to the other said arm, a first socket means formed in said ball joint, co-operating ball portions formed on each said shank and co-operating with said socket means, a second socket means formed in one of said shanks and a ball section co-operating therewith formed on the other of said shanks, said shanks bein arranged for independent rotation about oblique axes, said axes intersecting at a point corresponding to the center of said last-named ball sections.

5. In a steering linkage for an automotive vehicle having a steering gear pitman arm and a wheel steering arm and a drag link, a ball joint in said drag link comprising a housing, a first shank adapted to be secured to one of said arms, a second shank adapted to be secured to the other of said arms, socket means comprising a pair of oppositely disposed socket sections received in said housing, each of said shanks having a ball portion adapted to be seated within said socket means, the first ball portion on one of said shanks having a spherical depression formed therein, the second ball portion formed on the other of said shanks adapted to be seated in said spherical depression, said shanks being pivotally mounted for independent rotation about oblique axes, said axes intersecting at a point corresponding to the center of said second ball portion.

6. In a ball joint, a housing, a pair of opposed separable socket sections forming a spherical socket received within said housing, a first shank having one end formed as a section of a ball with a diameter conforming to and being seated within said socket, a spherical depression having a diameter substantially less than that of said socket formed in said first shank concentrically disposed with respect to said ball section, a second shank having two oppositely disposed ball sections of different diameters, one of said last-named ball sections being seated in said socket and the other being seated in said spherical depression.

7. In a ball joint, a tubular housing, a pair of opposed separable socket sections forming a spherical socket received within said housing, a first shank having one end formed in the section of a ball having a diameter conforming to and being seated within said socket, a spherical depression having a diameter substantially less than that of said socket formed in said first shank concentric with said ball section, a second shank having two diametrically oppositely disposed ball sections of different diameters, one of said last-named ball sections being seated in said socket and the other being seated in said depression, said socket, depression, and ball sections having a common center.

8. In a ball joint, a tubular housing, a pair of opposed separable socket sections forming a spherical socket received within said housing, a longitudinally extending opening at one side of said housing, a first shank having one end formed as substantially half a ball surface with a diameter conforming to that of said socket, said ball end being seated within said socket, a second opening in said tubular housing, a spherical depression having a diameter substantially less than that of said socket formed in said one end of said first shank concentric with said ball surface, a second shank passing through said second opening and having two oppositely disposed partial ball surfaces of different diameters, one of said last-named ball surfaces being seated in said socket and the other being seated in said depression.

9. The structure of claim 8 which is further characterized in that said second opening comprises two circular areas of different diameters, one of said areas being offset with respect to said longitudinally extending opening and having a diameter slightly exceeding the maximum transverse dimension of the larger of said last-named ball surfaces, the second said area being substantially aligned with said longitutdinally extending opening and having a substantially smaller diameter than said first area, said two circular areas overlapping so that said second shank may be introduced through the first said area and then moved to second said area to be secured therein.

10. In a joint, in combination, a housing having a hollow portion, a pair of connecting members angularly disposed with respect to each other and each having their inner ends pivotally connected to said housing, the axes of pivotal connection of said members to said housing being angularly disposed with respect to each other and intersecting in a common point within said housing.

JOHN J. WHARAM.
FRED G. LOON.

REFERENCES CITED

The following references are of record in the file of this patent:

UNITED STATES PATENTS

| Number | Name | Date |
|---|---|---|
| 1,919,670 | Roos | July 25, 1933 |
| 2,039,671 | Wagner | May 5, 1936 |
| 2,049,502 | Hufferd et al. | Aug. 4, 1936 |
| 2,113,094 | Paton | Apr. 5, 1938 |
| 2,152,506 | Thorne | Mar. 28, 1931 |
| 2,153,862 | Cowles | Apr. 11, 1939 |
| 2,195,336 | Loop | Mar. 26, 1940 |
| 2,215,243 | Klages | Sept. 17, 1940 |

FOREIGN PATENTS

| Number | Country | Date |
|---|---|---|
| 444,922 | Great Britain | Mar. 31, 1936 |